United States Patent
Oka et al.

(10) Patent No.: US 11,468,448 B2
(45) Date of Patent: *Oct. 11, 2022

(54) SYSTEMS AND METHODS OF PROVIDING SECURITY IN AN ELECTRONIC NETWORK

(71) Applicant: Microsoft Technology Licensing, LLC, Redmond, WA (US)

(72) Inventors: Anand Ravindra Oka, Bellevue, WA (US); Jayaram N. M. Nanduri, Issaquah, WA (US); John Alan Beaver, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/108,650

(22) Filed: Dec. 1, 2020

(65) Prior Publication Data
US 2021/0150531 A1    May 20, 2021

Related U.S. Application Data

(63) Continuation of application No. 15/844,095, filed on Dec. 15, 2017, now Pat. No. 10,891,621.

(Continued)

(51) Int. Cl.
*G06Q 20/40* (2012.01)
*G06Q 20/24* (2012.01)
(Continued)

(52) U.S. Cl.
CPC ......... *G06Q 20/4016* (2013.01); *G06Q 20/00* (2013.01); *G06Q 20/24* (2013.01); *G06Q 20/34* (2013.01); *G06Q 20/3827* (2013.01)

(58) Field of Classification Search
CPC ........ G06Q 20/00; G06Q 20/24; G06Q 20/34; G06Q 20/3827; G06Q 20/4016
(Continued)

(56) References Cited

U.S. PATENT DOCUMENTS 8,875,267 B1    10/2014 Kolman et al.
9,514,293 B1 *  12/2016 Moritz ................ H04L 67/143
(Continued)

FOREIGN PATENT DOCUMENTS

WO    2017011488 A1    1/2017

OTHER PUBLICATIONS

"Non Final Office Action Issued in U.S. Appl. No. 16/601,091", dated Jul. 14, 2021, 17 Pages.
(Continued)

*Primary Examiner* — Namrata Boveja
*Assistant Examiner* — Liz P Nguyen
(74) *Attorney, Agent, or Firm* — ArentFox Schiff

(57) ABSTRACT

This disclosure relates to systems and methods of risk detection in an electronic network. The method may include receiving a first portion of session context information for an interaction of an individual over a limited bandwidth network, the first portion including a session identifier for the interaction. The method may include retrieving a second portion of session context information for the interaction over a cloud data pipe using the session identifier, in response to receiving the first portion. The method may include accessing, a data structure representing connected knowledge of the individual. The method may include receiving, via a distributed system, security reputation data including aggregated information from a plurality of members. The method may include analyzing the session context information using the security reputation. The method may include generating a security risk score for the interaction based on the session context information, data structure, and the security reputation data.

18 Claims, 13 Drawing Sheets

Related U.S. Application Data

(60) Provisional application No. 62/543,182, filed on Aug. 9, 2017.

(51) Int. Cl.
   *G06Q 20/34* (2012.01)
   *G06Q 20/38* (2012.01)
   *G06Q 20/00* (2012.01)

(58) Field of Classification Search
   USPC .......................................................... 705/44
   See application file for complete search history.

(56) References Cited

U.S. PATENT DOCUMENTS

| | | |
|---|---|---|
| 2003/0200184 A1 | 10/2003 | Dominguez et al. |
| 2011/0270756 A1 | 11/2011 | Tullis et al. |
| 2012/0130898 A1* | 5/2012 | Snyder ............... G06Q 20/4014 705/44 |
| 2014/0172706 A1* | 6/2014 | Condry .............. G06Q 30/0601 705/44 |
| 2016/0260100 A1 | 9/2016 | Wiesman |
| 2016/0379135 A1 | 12/2016 | Shteingart et al. |
| 2017/0132636 A1 | 5/2017 | Caldera |
| 2017/0161742 A1 | 6/2017 | Martin-bale et al. |
| 2018/0033006 A1* | 2/2018 | Goldman ............ G06F 21/6218 |
| 2018/0034626 A1* | 2/2018 | Yamada ............ G06F 16/24553 |
| 2019/0140847 A1 | 5/2019 | Piel |
| 2020/0126085 A1 | 4/2020 | Roche et al. |
| 2020/0402054 A1 | 12/2020 | Manjunath et al. |

OTHER PUBLICATIONS

"Office Action Issued in European Patent Application No. 18739700.5", dated Nov. 25, 2021, 9 Pages.

"Final Office Action Issued in U.S. Appl. No. 16/601,091", dated Oct. 27, 2021, 22 Pages.

"Card and Identity Theft: Debit cards: The Next Fraud Frontier", In Report Information from Dialog, Nov. 22, 2006, 10 Pages.

"Notice of Allowance Issued in U.S. Appl. No. 16/601,091", dated Mar. 22, 2022, 13 Pages.

Dharwa, et al., "A Data Mining with Hybrid Approach Based Transaction Risk Score Generation Model (TRSGM) for Fraud Detection of Online Financial Transaction", In International Journal of Computer Applications, vol. 16, Issue 1, Feb. 2011, pp. 18-25.

"International Search Report and Written Opinion Issued in PCT Application No. PCT/US2018/038379", dated Sep. 17, 2018, 10 Pages.

"International Search Report and Written Opinion Issued in PCT Application No. PCT/US2020/031545", dated Jul. 27, 2020, 11 Pages.

* cited by examiner

SYSTEMS AND METHODS OF PROVIDING SECURITY IN AN ELECTRONIC NETWORK

CLAIM OF PRIORITY UNDER 35 U.S.C. § 119

This application is a continuation of U.S. patent application Ser. No. 15/844,095, titled "SYSTEMS AND METHODS OF PROVIDING SECURITY IN AN ELECTRONIC NETWORK," filed Dec. 15, 2017, which claims priority to U.S. Provisional Application Ser. No. 62/543,182, titled "SYSTEMS AND METHODS OF PROVIDING FRAUD PROTECTION IN A TRANSACTION NETWORK," filed Aug. 9, 2017, both of which are assigned to the assignee hereof, and incorporated herein by reference in their entirety.

BACKGROUND

The present disclosure relates to providing security in a digital network, and more particularly, to sharing information between network actors.

Fraudulent transactions are known to occur within an electronic network. For example, credit card fraud may occur when a fraudster uses stolen credit card information to make a purchase. Online transactions are seen as particularly susceptible to fraud because, by nature, the credit card is not present at the site of the transaction and the purchaser cannot be physically verified. Conventionally, each party involved in a financial transaction may attempt to mitigate fraud based on the information the party has available. Some parties may outsource detection to third party providers. However, the ability of any party to determine whether a transaction is fraudulent may be limited.

Thus, there is a need in the art for improvements in fraud detection for in a transaction network.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a method of evaluating a customer transaction. The method may include receiving a first portion of session context information for a customer transaction over a card network, the first portion including a session identifier. The method may include receiving a second portion of session context information for the customer transaction over a cloud data pipe using the session identifier, in response to receiving the first portion. The method may include accessing, a data structure representing connected knowledge of the customer. The method may include receiving, via a distributed system, a consortium trust-base including aggregated information from consortium members. The method may include analyzing the session context information using the trust-base data. The method may include generating a fraud score for the transaction based on the session context information, data structure, and consortium trust-base data.

Another example implementation relates to a method of maintaining a distributed trust-base. The method may include receiving a determination regarding an entity from a first party, wherein the determination includes a hash identifying the entity. The method may include writing the determination into an immutable storage in a way that prevents modification of the data. The method may include providing access to the determination to a second party for evaluation of second transaction information that matches the entity. The method may include evaluating the second transaction based on the stored determination.

Another example implementation relates to a method of performing an electronic transaction. The method may include monitoring a customer interaction with a website related to a purchase on the website. The method may include generating transaction data based on payment information for the purchase, the transaction data including a session identifier. The method may include generating transaction contextual data based on the monitoring, the transaction contextual data including the session identifier. The method may include transmitting the transaction data via a card network. The method may include transmitting the transaction contextual data to a cloud data pipe. The method may include receiving a decision of whether the transaction is approved.

In another example, the disclosure provides a computer device for fraud detection in a transaction network. The computer device may include a memory storing one or more parameters or instructions for executing an operating system and one or more applications. The computer device may include at least one processor coupled to the memory. The at least one processor may be configured to receive a first portion of session context information for a customer transaction over a card network, the first portion including a session identifier. The at least one processor may be configured to retrieve a second portion of session context information for the customer transaction over a cloud data pipe using the session identifier, in response to receiving the first portion. The at least one processor may be configured to access, a data structure representing connected knowledge of the customer. The at least one processor may be configured to receive, via a distributed system, consortium trust-base data including aggregated information from consortium members. The at least one processor may be configured to analyze the session context information using the trust-base data. The at least one processor may be configured to generate a fraud score for the transaction based on the session context information, data structure, and the consortium trust-base data.

In another example, the disclosure provides a computer-readable medium, comprising code executable by one or more processors for fraud detection in a transaction network. The computer-readable medium may include code for receiving a first portion of session context information for a customer transaction over a card network, the first portion including a session identifier. The computer-readable medium may include code for retrieving a second portion of session context information for the customer transaction over a cloud data pipe using the session identifier, in response to receiving the first portion. The computer-readable medium may include code for accessing, a data structure representing connected knowledge of the customer. The computer-readable medium may include code for receiving, via a distributed system, consortium trust-base data including aggregated information from consortium members. The computer-readable medium may include code for analyzing the session context information using the trust-base data. The computer-readable medium may include code for generating a fraud score for the transaction based on the session context information, data structure, and the consortium trust-base data.

In another example, the disclosure provides a computer device for maintaining a distributed trust-base. The computer device may include a memory storing one or more parameters or instructions for executing an operating system and one or more applications. The computer device may include at least one processor coupled to the memory. The at least one processor may be configured to receive a determination regarding an entity from a first party, wherein the determination includes a hash identifying the entity. The at least one processor may be configured to write the determination into an immutable storage in a way that prevents modification of the data. The at least one processor may be configured to provide access to the determination to a second party for evaluation of second transaction information that matches the entity. The at least one processor may be configured to evaluating the second transaction based on the stored determination.

In another example, the disclosure provides a computer-readable medium, comprising code executable by one or more processors for maintaining a distributed trust-base. The computer-readable medium may include code for receiving a determination regarding an entity from a first party, wherein the determination includes a hash identifying the entity. The computer-readable medium may include code for writing the determination into an immutable storage in a way that prevents modification of the data. The computer-readable medium may include code for providing access to the determination to a second party for evaluation of second transaction information that matches the entity. The computer-readable medium may include code for evaluating the second transaction based on the stored determination.

In another example, the disclosure provides a computer device for performing an electronic transaction. The computer device may include a memory storing one or more parameters or instructions for executing an operating system and one or more applications. The computer device may include at least one processor coupled to the memory. The at least one processor may be configured to monitor a customer interaction with a website related to a purchase on the website. The at least one processor may be configured to generate transaction data based on payment information for the purchase, the transaction data including a session identifier. The at least one processor may be configured to generate transaction contextual data based on the monitoring, the transaction contextual data including the session identifier and transaction contextual data. The at least one processor may be configured to transmit the transaction data via a card network. The at least one processor may be configured to transmit the transaction contextual data to a cloud data pipe. The at least one processor may be configured to receive a decision of whether the transaction is approved In another example, the disclosure provides a computer-readable medium, comprising code executable by one or more processors for performing an electronic transaction. The computer-readable medium may include code for generating transaction data based on payment information for the purchase, the transaction data including a session identifier. The computer-readable medium may include code for generating transaction contextual data based on the monitoring, the transaction contextual data including the session identifier and transaction contextual data. The computer-readable medium may include code for transmitting the transaction data via a card network. The computer-readable medium may include code for transmitting the transaction contextual data to a cloud data pipe. The computer-readable medium may include code for receiving a decision of whether the transaction is approved.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides systems and methods for protecting against fraud in transactions.

In an implementation, for example, this disclosure provides systems and methods for providing a service to merchants and/or banks that provides expanded real-time transaction fraud evaluation. For example, the service may provide access to a cloud data pipe that allows merchants to provide additional contextual information related to a transaction to a card issuer. The card issuer may use the additional contextual information to evaluate and/or approve or disapprove the transaction. The system and methods may also provide for a consortium sharing service that allows multiple parties to securely, trustfully, immutably, and scalably share information that may be useful to other members of the consortium for detecting fraud. For example, members of the consortium may publish obfuscated hashes that may be used to identify known bad actors (e.g., fraudsters) and/or one or more models that define a potentially fraudulent transaction.

Figure 1:
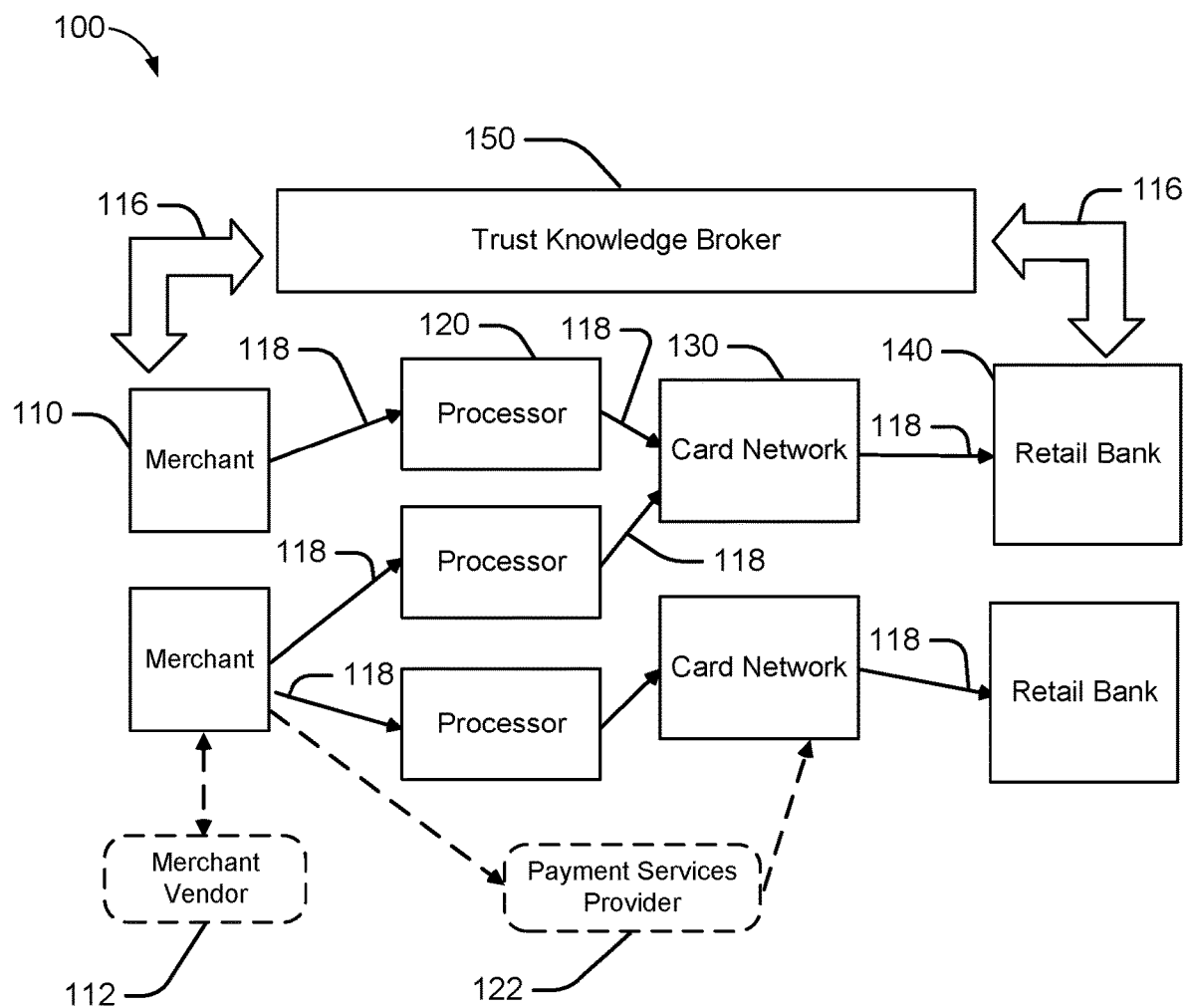
FIG. 1 is a schematic block diagram of an example system for evaluating a transaction.

FIG. 1 is a schematic block diagram of an example system 100 for evaluating a transaction in order to detect fraud. The transaction may be, for example, but is not limited to, a credit card transaction. In a non-limiting implementation, the transaction may be a card-not-present transaction with a merchant 110 conducted via a website of the merchant 110.

In a traditional card-not-present transaction, the merchant 110 collects transaction data from the customer, usually using a form on the website completed by the customer. The merchant 110 traditionally validates the transaction by forwarding the transaction data 118 to a processor 120, who transmits the transaction data 118 to a retail bank (e.g., a card issuer) via a card network 130. The merchant 110 may also communicate with a merchant vendor 112, who may provide fraud screening based on the transaction data 118. Similarly, a payment services provider 122 may provide some degree of fraud screening. The card network 130 may limit the transaction information to certain fixed, pre-defined fields. Accordingly, a retail bank 140 may be provided a limited data set upon which to determine whether the transaction is fraudulent.

The disclosure provides for a trust knowledge broker 150 that provides for additional communication and data sharing between merchants 110 and retail banks 140. In some implementations, the trust knowledge broker 150 may provide a second data channel, which may be separate from or integrated with the card network 130, and which may be used to transmit transaction contextual data 116 in addition to the transaction data 118. The transaction data 118 and the transaction contextual data 116 may be linked by a common session identifier and together be referred to as session contextual data. In other implementations, the trust knowledge broker 150 provides, maintains, supports or otherwise enables a communication channel that allows the transaction data 118 and the transaction contextual data 116 to be sent from the merchants 110 to the retail banks 140. The transaction contextual data 116 may allow the retail bank 140 to make a better evaluation of the transaction based on the additional information represented by the transaction contextual information. Additionally, the system 100 and the trust knowledge broker 150 are not limited to credit card transactions, and may be used for providing contextual information for a variety of transactions such as debit cards, direct transfers (e.g., SEPA, ACH), and payment services (e.g., PayPal).

Figure 2:
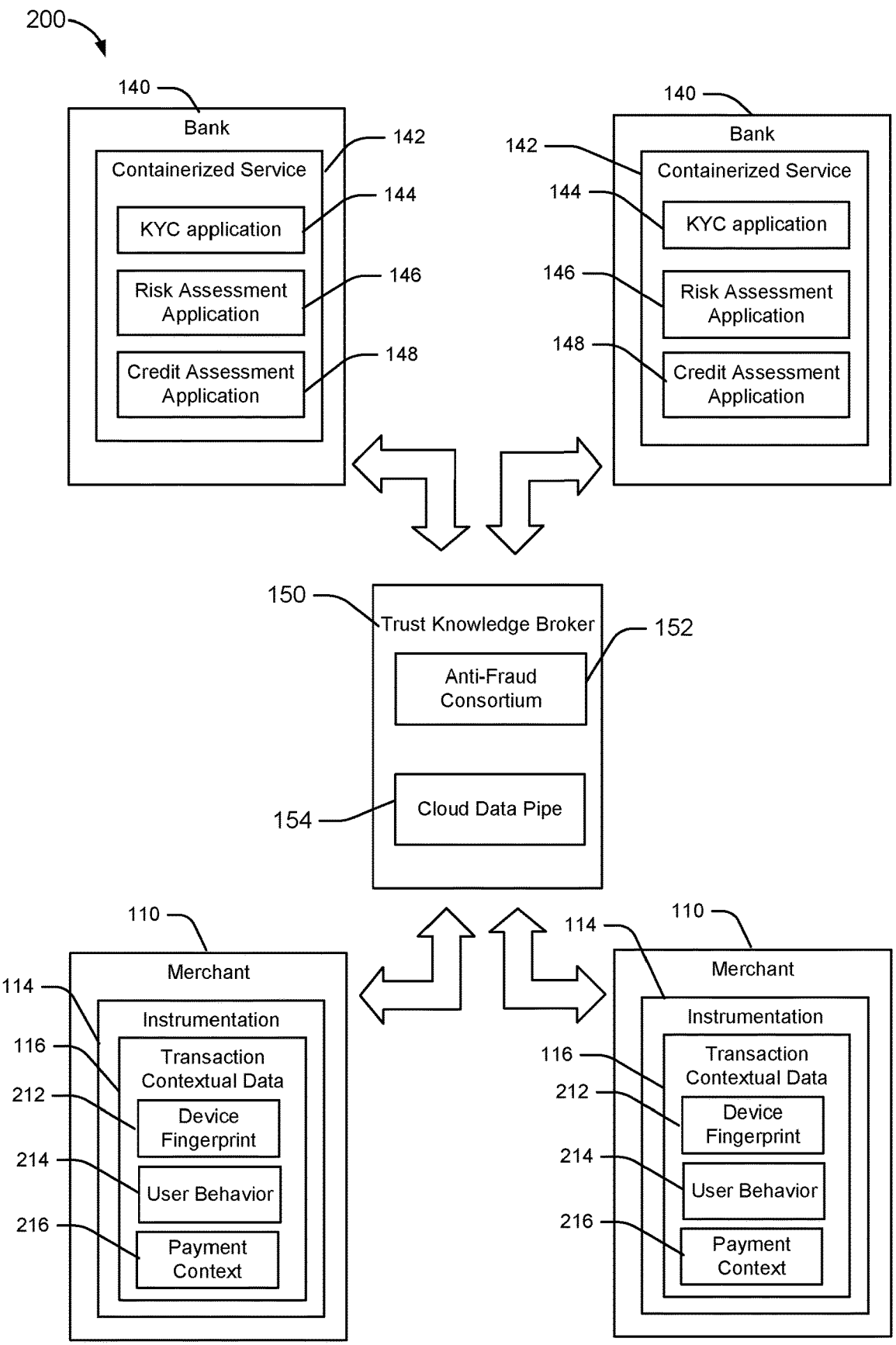
FIG. 2 is a schematic block diagram of an example network for validating a transaction.

FIG. 2 is a schematic block diagram of an example network 200 for validating a transaction based on a fraud assessment. The network 200 may include one or more merchants 110, one or more banks 140, and the trust knowledge broker 150. The merchants 110 may also be referred to as a merchant gateway or gateway. The banks 140 may include other financial institutions and may be referred to as a bank, credit union, issuer, or issuing institution. The trust knowledge broker 150 may be a network or cloud service. The trust knowledge broker 150 may be referred to as a cloud service. In an implementation, the trust knowledge broker 150 may be implemented on multiple geographically distributed data centers. For example, in an implementation, the trust knowledge broker 150 may be implemented using a cloud data service such as the Microsoft Azure cloud services platform.

The merchant 110 may implement instrumentation 114 on a website of the merchant. For example, the instrumentation 114 may be provided as a software development kit (SDK) for providing instrumentation to the website of the merchant 110. The SDK may also be referred to as a merchant container. The merchant 110 may host the web site and instrumentation 114 on one or more enterprise servers or cloud servers. The instrumentation 114 may provide the web site with capability to monitor a customer's interaction with the website. The instrumentation 114 may also interact with the trust knowledge broker 150, for example, by sending transaction contextual data 116 for a session (e.g., user interaction with the merchant website) leading to the transaction. In an implementation, the transaction contextual data 116 may include a device fingerprint 212 identifying a hardware device (or virtual device) used to make a transaction. The device fingerprint 212 may be a fuzzy identification of a user device that may be applicable across multiple sessions and properties (e.g., websites). The fuzzy identification may not require any specific piece of identification, but may instead may be based on a set of available information. The available information may be hashed according to a defined algorithm to generate the device fingerprint such that when the set of available information is used for another transaction, the device can be identified. For example, the device fingerprint 212 may enable detection and defense against bot behavior. Further, for example, the device fingerprint 212 may be used in fraud and abuse prevention scenarios including sign-up, login, account updates, checkout, and transactions. For instance, the instrumentation 114 may place tags on multiple pages that track user behavior 214 and engagement using the device fingerprint 212. The tracked user behavior 214 defined in the transaction contextual data 116 may be used to differentiate a bot from a human, identify risky behavior, or find fraudsters using multiple accounts from the same machine. As another example of transaction contextual information, the instrumentation 114 may determine a payment context 216. The payment context 216 may include information regarding a user's account or payment details. For example, the payment context 216 may include an age of the customer's account, whether the payment information is stored by the website, and/or how many times the payment information has been used at the web site. The instrumentation 114 may provide the transaction contextual data 116, to the trust knowledge broker 150 and/or one or more banks 140. Accordingly, analysis of the device fingerprinting, user behavior, and/or payment context may be performed by the merchant 110, the trust knowledge broker 150, and/or a bank 140 and used in determining whether the transaction is a fraudulent transaction.

The trust knowledge broker 150 may be a distributed service provided by a third party separate from the merchants 110 and the banks 140. The trust knowledge broker 150 may exchange information between the merchants 110 and the banks 140 in a manner that protects privacy interests of customers (e.g., users performing the transactions) and preserves business knowledge of merchants 110 and banks 140 while allowing sharing of information for fraud prevention purposes. In the illustrated implementation, the trust knowledge broker 150 may provide an anti-fraud consortium 152 and a cloud data pipe 154.

The anti-fraud consortium 152 may be an information storage system that allows fraud information to be exchanged between members of a consortium, who agree to certain rules and uses for the information. The anti-fraud consortium 152 may also be referred to interchangeably herein as a fraud information exchange, a consortium data exchange, consortium trust-base, or consortium blockchain. The trust knowledge broker 150 may enforce the consortium rules via techniques for structuring and storing data in the anti-fraud consortium 152. For example, in one implementation, the anti-fraud consortium 152 may operate as a private blockchain. Consortium members may be allowed to submit information for recordation in the blockchain. The trust knowledge broker 150 and/or consortium members may verify submitted information when adding the submitted information to the blockchain. The anti-fraud consortium 152 may include any information that may be useful for detecting fraudulent transactions. The information may be obfuscated to hide personally identifying information of customers and also to protect business data of consortium members. An example of fraud information that may be added to the anti-fraud consortium 152 may include, but is not limited to, bad actor information, which may include information (e.g., hashes identifying a device, internet protocol address, phone, email, account information) for any transaction that is deemed to be fraudulent, as well as other determinations such as charge backs. Linkages to previously known fraud may provide valuable information when assessing a current transaction for fraud. Another example of fraud information may include fraudulent transaction model information, which may identify ranges of information (e.g., device IDs, IP addresses, types of transactions, etc.) determined or predicted to be associated with a fraudulent transaction. By sharing fraud information, such as bad actor information and/or fraudulent transaction model information, between institutions, each institution may be immunized against incipient fraud attacks by fraud rings that have already targeted other consortium members. Additionally, the shared knowledge may improve time to detect and mitigate new fraud attacks.

The cloud data pipe 154 may be a distributed system for sharing transaction contextual data 116. The cloud data pipe 154 may provide temporary cloud based storage of the contextual data 116 provided by a merchant 110 so that a bank 140 may retrieve the transaction contextual data 116. The cloud data pipe 154 may use a correlation vector to identify a set of transaction contextual data 116. The correlation vector may be an identifier that can be included within the limited fields of transaction data 118. The cloud data pipe 154 may provide the transaction contextual data 116 to a bank 140 in response to a request to retrieve the transaction contextual data 116 using the correlation vector. Generally, the request for the transaction contextual data 116 for a particular transaction is expected to quickly follow receipt of the transaction contextual data from the merchant 110. The cloud data pipe 154 may include a cache for temporarily storing transaction contextual data 116 that has not yet been retrieved. Further, the cloud data pipe 154 may store the transaction contextual data 116 for a limited time before purging the stored data. As a privacy protection, the received transaction contextual data 116 may include hashed values of customer personal identifying information. Accordingly, the transaction contextual data 116 stored in the cloud data pipe 154 may be used to evaluate transactions, but may not be useful for fraudulent purposes if unauthorized access occurs.

The bank 140 may implement a containerized service 142 for interacting with the trust knowledge broker 150 and performing various operations on a transaction. The containerized service 142 may operate as a fully on-premise system, a fully cloud based service, or a hybrid cloud service. Accordingly, the bank 140 may maintain physical control of all or portions of data if necessary. The containerized service 142 may include various components providing different applications that may be utilized by the bank 140. Example applications include a know your customer (KYC) application 144 for storing relational information of a customer, a risk assessment application 146 for analyzing risk (including fraud) of a transaction, and a credit assessment application 148 for evaluating credit of a customer.

The KYC application 144 may unify and connect customer data across fragmented scenarios and systems into a single data structure (e.g., a graph). For example, an institution such as a bank may interact with the same customer in various scenarios (e.g., credit card, mortgage, vehicle loan, retirement accounts) and may have different sets of data for each scenario. The KYC application 144 may unify the customer information from the different scenarios into a single data structure that includes connections between different elements. The KYC application 144 may also create a rich set of actionable knowledge based on customer interactions. For example, the KYC application 144 may include analysis tools to generate metrics for a customer. The KYC application 144 may also manage scenario-specific requirements and compliance restrictions, e.g., using multiple instances of graphs, to keep specific data isolated when necessary. Further details regarding the KYC application 144 are provided below with respect to FIG. 7.

The risk assessment application 146 may provide fraud and abuse protection. The risk assessment application 146 may operate on transaction information received via card network 130, transaction contextual data 116 received via cloud data pipe 154, fraud information received via anti-fraud consortium 152, and customer information provided by the KYC application 144. The risk assessment application 146 may perform automated scoring using advanced machine learned scoring, long-term and short-term modeling, unsupervised learning, fraud sweeps, and anomaly detection. Transactions that are determined to be clearly authentic or clearly fraudulent may be determined based on the automated scoring. Transactions resulting in an intermediate score may be reviewed manually using a manual review graphical user interface (GUI) to present the relevant information to an analyst who makes a final decision.

The credit assessment application 148 may use machine learning to assess the credit worthiness of a customer. In addition to credit ratings, the credit assessment application 148 may use information from the KYC application 144 to evaluate a customer. For example, the credit assessment application 148 may consider account hierarchy, customer/partner requested credit values, payment history, purchase history, dunning status and history, and risk data from risk assessment application 146. In an implementation, the credit assessment application 148 may use a scorecard model to separate scores of good and bad customers.

Figure 3:
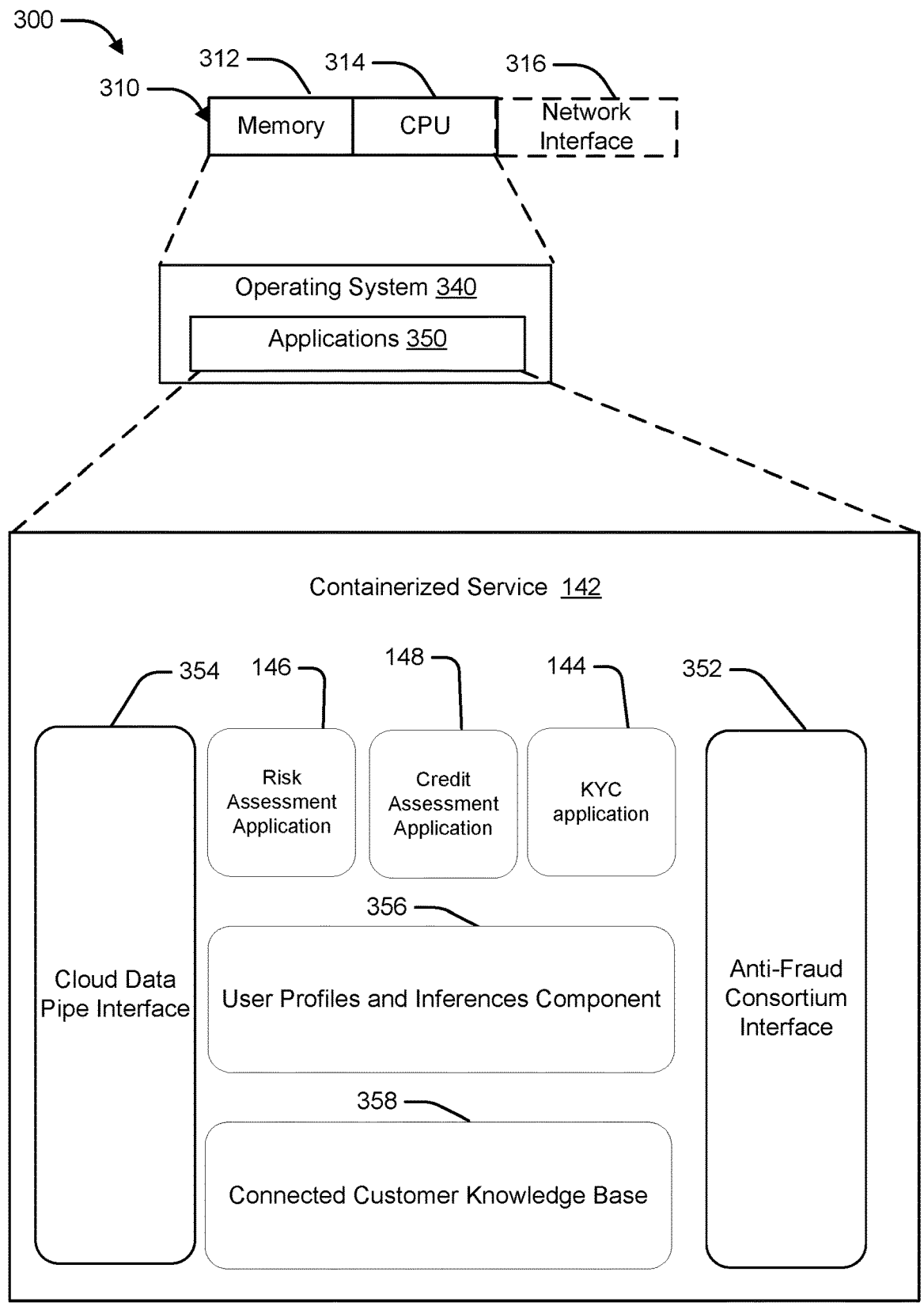
FIG. 3 is a conceptual diagram of components of an example fraud detection system.

FIG. 3 is a conceptual diagram of example components of a fraud detection system 300. The example fraud detection system 300 may include one or more computer devices 310 that provide the containerized service 142. Computer device 310 may include any mobile or fixed computer device, which may be connectable to a network. Computer device 310 may be, for example, a computer device such as a desktop or laptop or tablet computer, a server, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Computer device 310 may include a memory 312 and CPU 314 configured to control the operation of computer device 310. Memory 312 may be configured for storing data and/or computer-executable instructions defining and/or associated with an operating system 340 and/or application 350, and CPU 314 may execute operating system 340 and/or applications 350. An example of memory 312 can include, but is not limited to, a type of memory usable by a computer, such as random access memory (RAM), read only memory (ROM), tapes, magnetic discs, optical discs, volatile memory, non-volatile memory, and any combination thereof. Memory 312 may store local versions of applications being executed by CPU 314.

The CPU 314 may include one or more processors for executing instructions. An example of CPU 314 can include, but is not limited to, any processor specially programmed as described herein, including a controller, microcontroller, application specific integrated circuit (ASIC), field programmable gate array (FPGA), system on chip (SoC), or other programmable logic or state machine. The CPU 314 may include other processing components such as an arithmetic logic unit (ALU), registers, and a control unit.

The computer device 310 may also include a network interface 316 for communicating with other computer devices. The network interface 316 may be, for example, a wired or wireless modem.

The operating system 340 may include instructions (such as applications 350) stored in memory 312 and executed by the CPU 314. The operating system 340 may include the containerized service 142 for providing fraud protection. For example, the containerized service 142 may include the KYC application 144 for storing and analyzing connected customer information, the risk assessment application 146 for determining a risk associated with a transaction, and the credit assessment application 148 for determining whether to extend credit. The computer device 310 may also include applications 350 including instructions stored in memory 312 and executed by the CPU 314. The application 350, for example, may be a containerized service 142.

As discussed above, the containerized service 142 may include the KYC application 144, the risk assessment application 146, and the credit assessment application 148. The containerized service 142 may also include an anti-fraud consortium interface 352 for interacting with the anti-fraud consortium 152 and a cloud data pipe interface 354 for interacting with the cloud data pipe 154.

In an implementation, the containerized service 142 may include a connected customer knowledge base 358. The connected customer knowledge base 358 may provide a semantic representation of connected customer knowledge. That is, the connected customer knowledge base 358 may store the data used by the KYC application 144. The connected customer knowledge base 358 may also support the risk assessment application 146 and the credit assessment application 148, as well as other enterprise uses such as marketing. In an implementation, the connected customer knowledge base 358 may store a customer knowledge graph in a cloud database such as a Microsoft Azure Cosmos Database. The connected customer knowledge base 358 may be created using data from other enterprise databases using pre-defined universal ontologies to generate semantic graph knowledge. The connected customer knowledge base 358 may be secure, privacy compliant, scalable, performant, and fresh. The connected customer knowledge base 358 may seamlessly connect to the cloud data pipe 154 and the anti-fraud consortium 152 based on the universal ontologies.

In an implementation, the containerized service 142 may also include a user profiles and inferences component 356 that tracks information for customers that is generated by analysis rather than factual data. For example, the data stored by the connected customer knowledge base 358 may include data supplied by the customer and records of transactions involving the customer, whereas the user profiles and inferences component 356 may include inferences regarding the customer such as classifications, predictions, and models. The user profiles and inferences component 356 may automate and share common user profiles and semantics by providing a consistent view of artificial intelligence inferences made about a customer. For example, the user profiles and inferences component 356 may include machine learning (ML) models driven from knowledge graphs with fast automated retraining. The user profiles and inferences component 356 may store scores and inferences back into the knowledge graph. The user profiles and inferences component 356 may support the KYC application 144, risk assessment application 146, and the credit assessment application 148.

Figure 4:
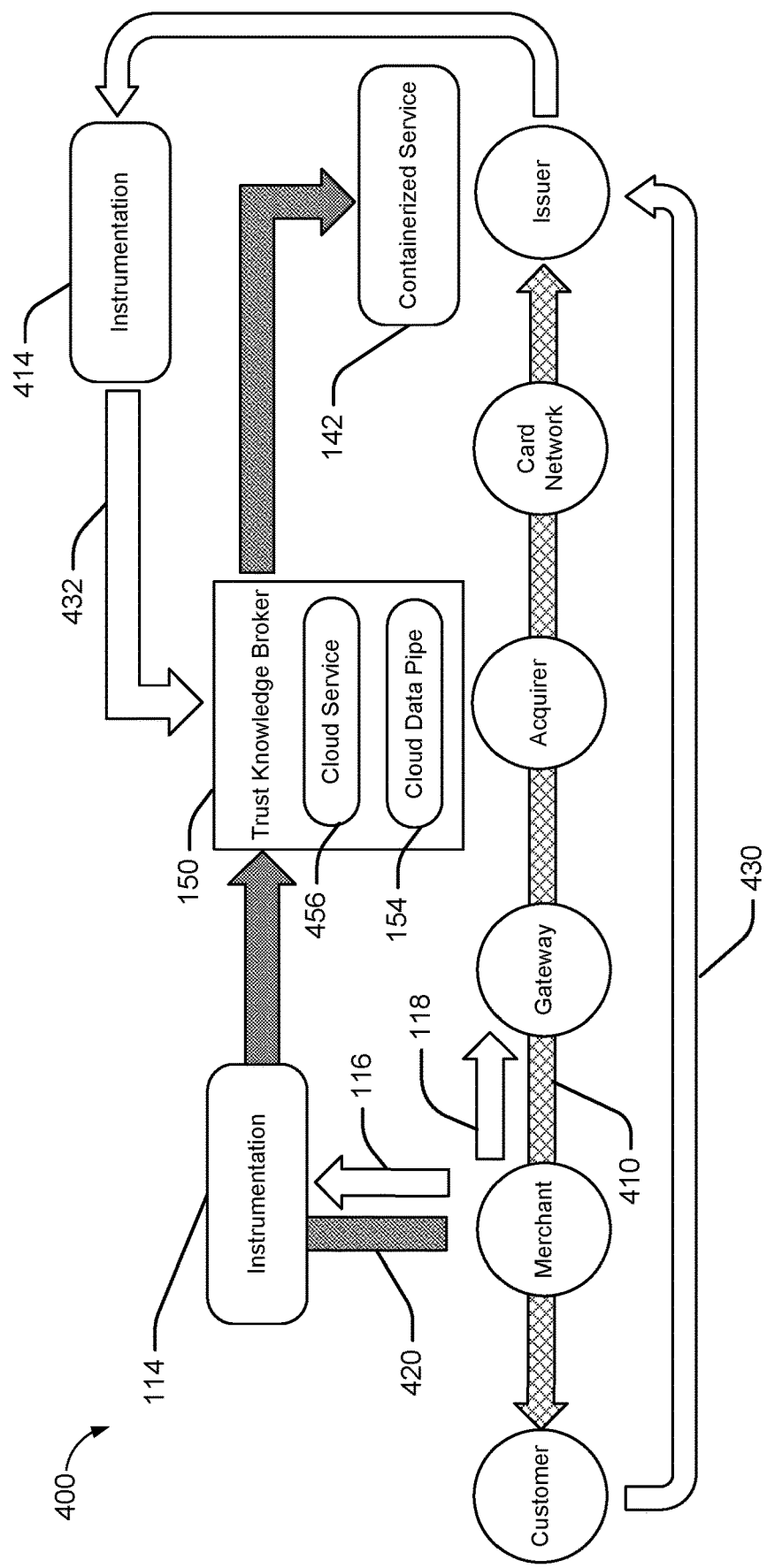
FIG. 4 is a schematic diagram of an example settlement flow using a cloud data pipe.

FIG. 4 is a schematic diagram of an example settlement flow 400 using the cloud data pipe 154. The merchant website may include instrumentation 114, which may also be referred to as a cloud data pipe SDK. The bank or issuer of the credit card may include the containerized service 142, which may also be referred to as an issuer risk solution. When a customer makes a purchase, for example, using the merchant webpage, the merchant sends the transaction to issue via a conventional card network 410, which may be an example of a first data channel. The transaction data 118 transmitted over the card network may include a session identifier or correlation vector. The merchant may also transmit rich context about the transaction, e.g., transaction contextual data 116, via the instrumentation 114 and the cloud data pipe 154 of the trust knowledge broker 154, which may be represented by a second data channel 420. The bank 140 may receive the transaction data 118 including the correlation vector via the card network. Using the correlation vector, the issuer may retrieve the rich context about the transaction, e.g., transaction contextual data 116, from the cloud data pipe 154. The issuer may augment its own understanding of the customer in its knowledge graph using the rich context about the transaction, e.g., transaction contextual data 116. In an implementation, the issuer may have knowledge about the customer due to the customer's use of the issuer's web services. For example, the issuer may provide a website for managing the credit card. The issuer may also provide other services that a customer may access using the same account or a linked account. The website of the issuer may include instrumentation 414, which may be similar to the instrumentation 114 at the website of the merchant. Accordingly, the instrumentation 414 at the issuer website may monitor customer interactions 430. As discussed above with respect to instrumentation 114, the instrumentation 414 may collect transaction contextual data 116 such as a device fingerprint 212, user behavior 214, and payment context 216. The instrumentation 414 of the issuer's website may provide such information as session contextual data 432 to the trust knowledge broker 150. The session context data 432 may also be referred to as forensic data because the session context data may include evidence of past customer behavior. The trust knowledge broker 150 may include a cloud service 456 that compares the session contextual data 432 with the transaction contextual data 116. For example, the device fingerprints may be compared to determine whether the same device is being used for both interaction with the issuer (e.g., paying statement balance) and interaction with the merchant (e.g., making a purchase). The trust knowledge broker 150 may provide the session contextual data 432, transaction contextual data 116, or a combination thereof to the containerized service 142 of the issuer, for example, using the cloud data pipe 154. The issuer may then make an authorization determination depending on the fraud evaluation performed based on the transaction data 118, the transaction contextual data 116, and the session contextual data 432.

Figure 5:
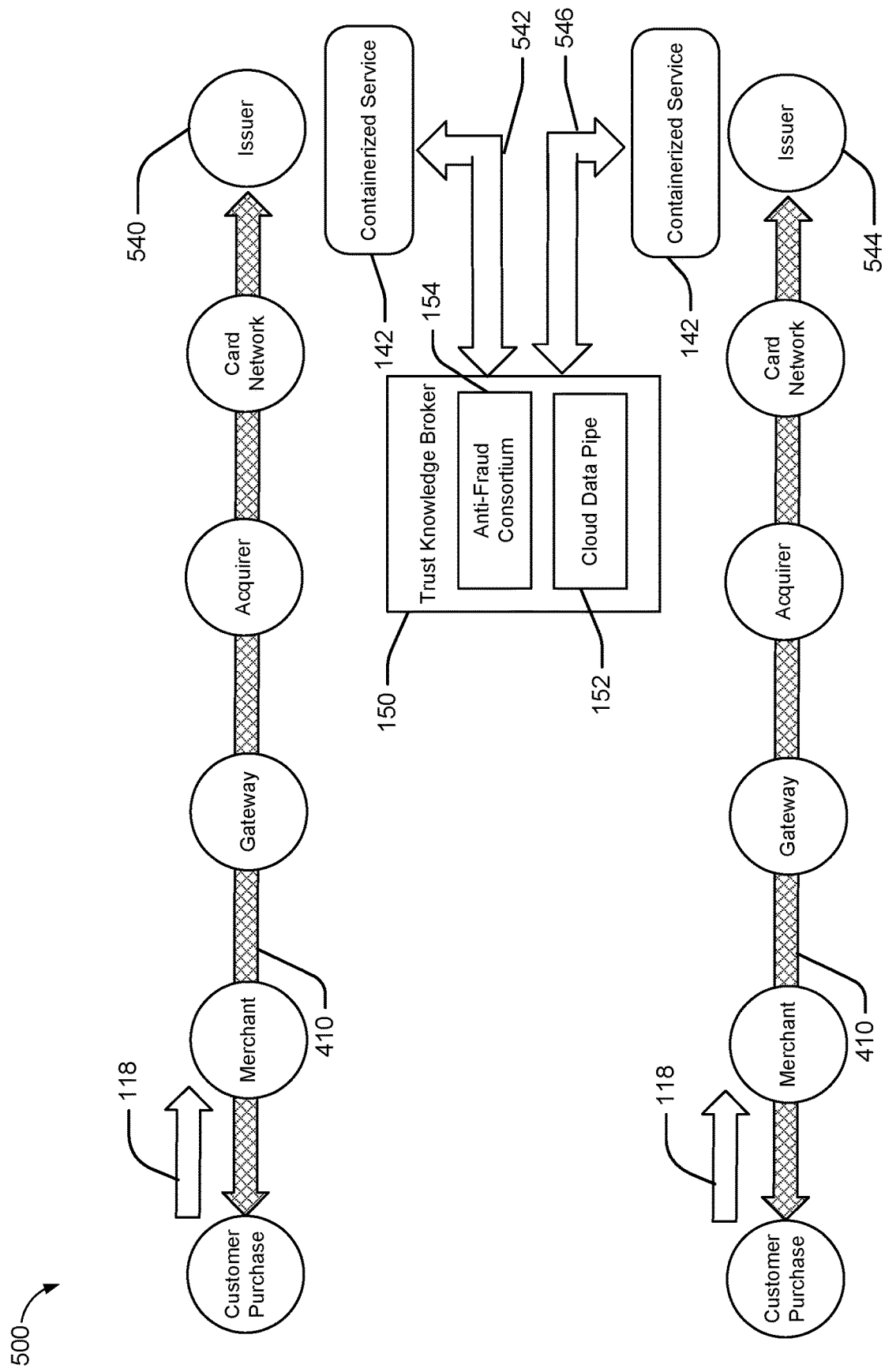
FIG. 5 is a schematic diagram of an example settlement flow using an anti-fraud consortium.

FIG. 5 is a schematic diagram of an example settlement flow 500 using an anti-fraud consortium 152, which may be hosted by the trust knowledge broker 150. When a customer makes a purchase, the transaction data 118 may be routed through the conventional card network 410 to a first issuer 540, which may be a retail bank 140. If the first issuer 540, e.g., using risk assessment application 146, determines that the transaction is fraudulent or otherwise negative, either in real-time or later, the first issuer 540 may publish information 542 regarding the bad transaction to the anti-fraud consortium 152. The trust knowledge broker 150 may enforce the first issuer's data sharing policy as well as privacy and compliance requirements on the published information. The trust knowledge broker 150 may update other consortium members (e.g., second issuer 544) about fraud patterns and bad actors by sending obfuscated information 546. For example, the trust knowledge broker 150 may use the anti-fraud consortium 152 to provide periodic updates or respond to queries from consortium members. In another implementation, the trust knowledge broker 150 may include a risk assessment application similar to the risk assessment application 146 that may perform analysis of received fraud data and update other consortium members about fraud patterns and bad actors.

Figure 6:
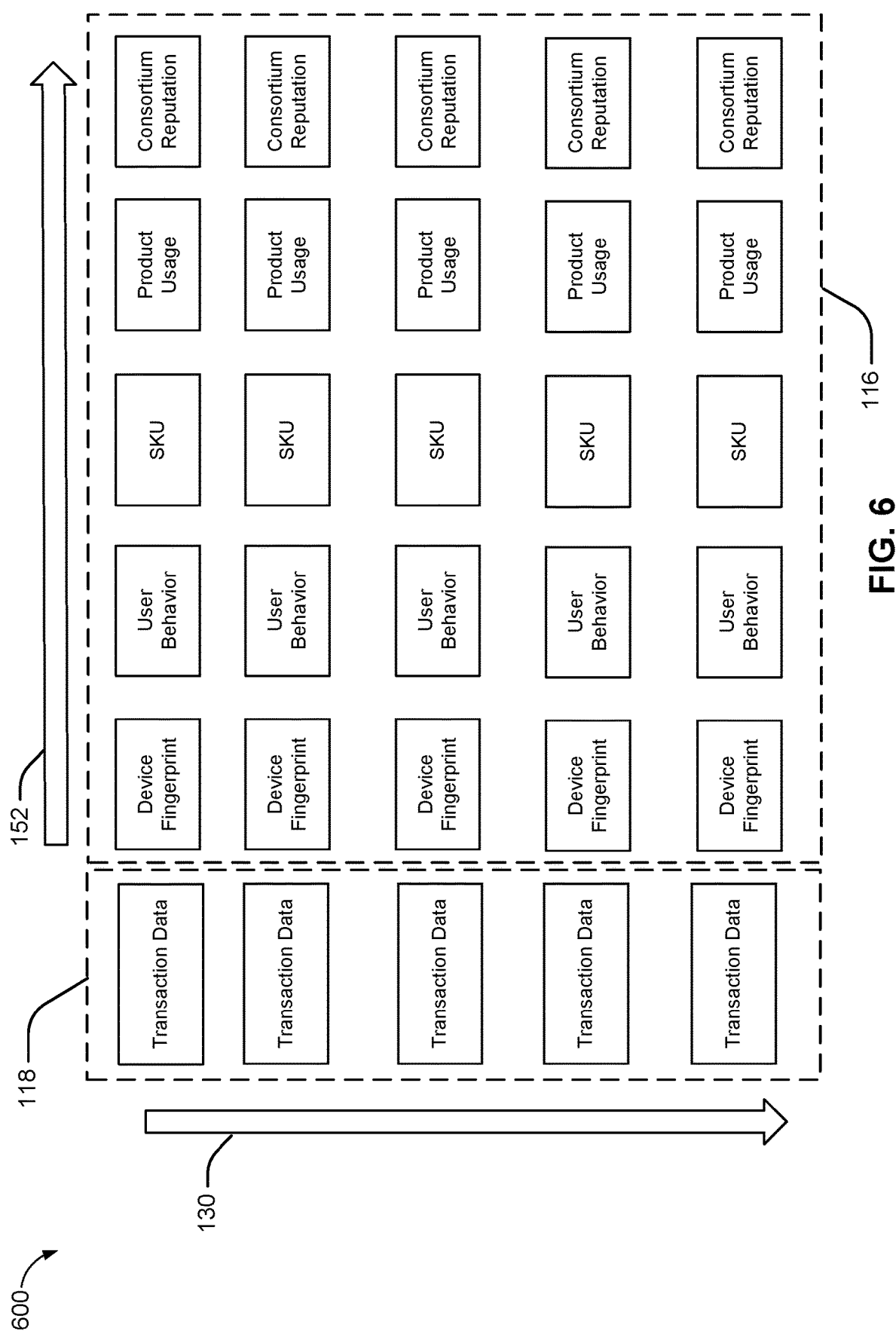
FIG. 6 is a conceptual diagram of an example card network and cloud data pipe data.

FIG. 6 is a conceptual diagram 600 of an example card network and cloud data pipe data. The card network 130 may carry transaction data 118 including card information, transaction amount, merchant category code (MCC), geographic location, merchant identification number (MID), point of sale, and terminal for each transaction. The cloud data pipe 154 may include additional information, e.g., transaction contextual data 116, including a device fingerprint 212, user behavior 214, stock keeping unit (SKU), and product usage for each transaction. The transaction data 118 and the transaction contextual data 116 may be correlated using a session identifier included in both sets of data. The transaction contextual data 116 may be provided by the merchants 110 to the cloud data pipe 154 as hashed values. Accordingly, plain text personally identifiable information (PII) may be maintained at the merchant 110. The banks 140 may operate on the hashed values for the transaction contextual data 116. The hashed values, especially when correlated via a session identifier, allow for detection of fraud based on the relationships between the hashed values and the transaction data 118. As discussed in further detail below, the anti-fraud consortium 152 may provide information regarding reputations across banks and merchants based on the transaction data 118 and/or the transaction contextual data 116. When a bank 140 sees a transaction as fraud, the bank 140 may publish a fraudulent transaction along with associated email-hash/device-hash/IP-hash to the anti-fraud consortium 152. When another bank 140 is vetting a second transaction, the other bank 140 may query the anti-fraud consortium 152 based on the email/device/IP-hash (received as transaction contextual data 116 via the cloud data pipe 154), and get the knowledge of whether those hashes have been associated with fraud. Accordingly, to identify connections to previous instances of fraud, banks 140 never need to know the plan-text value of any of the transaction contextual data 116 (which may include PII) coming from merchant 110. The bank 140 only needs the hash values. Therefore, no one with access to the anti-fraud consortium 152, legally or illegally, can work out the identity of customers from the hashed data stored in the anti-fraud consortium 152.

Figure 7:
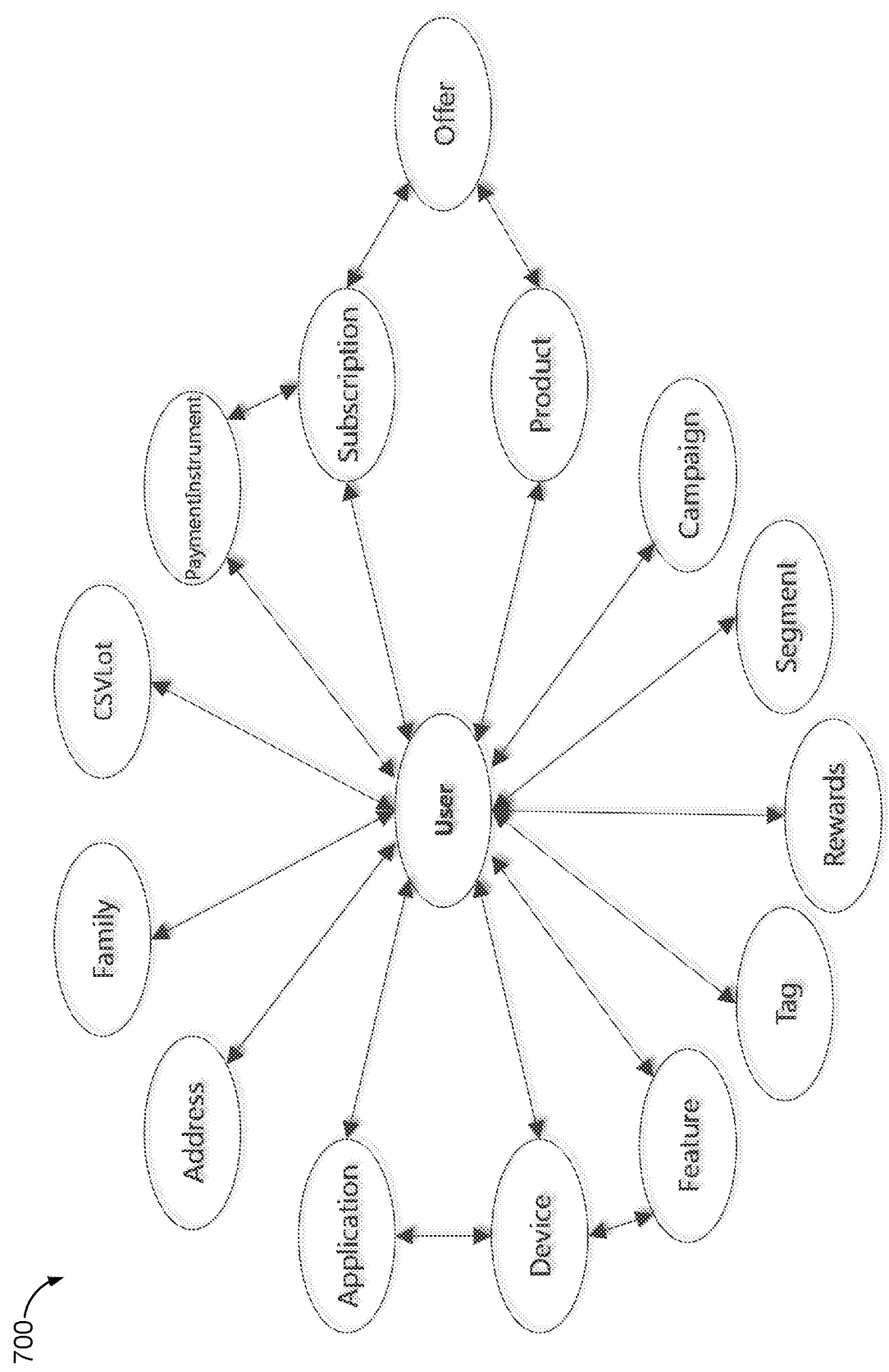
FIG. 7 is a conceptual diagram of an example customer graph.

FIG. 7 is a conceptual diagram of an example customer graph 700. The customer graph 700 may be used by the KYC application 144 to store customer information in the connected customer knowledge base 358. The customer graph 700 may include nodes and edges. The nodes may be pieces of information about the customer. The edges may represent associations between pieces of information, such as the information being included in the same transaction. For example, nodes may include information regarding an application, device, and feature used to make a single purchase. Each of the nodes for the purchase may be connected via edges. The graph 700 may be stored in the connected customer knowledge base 358, which may use a pre-determined ontology to represent various pieces of information. Accordingly, for example, a customer's transactions with different merchants may be represented by similar sets of nodes for easy comparison.

Figure 8:
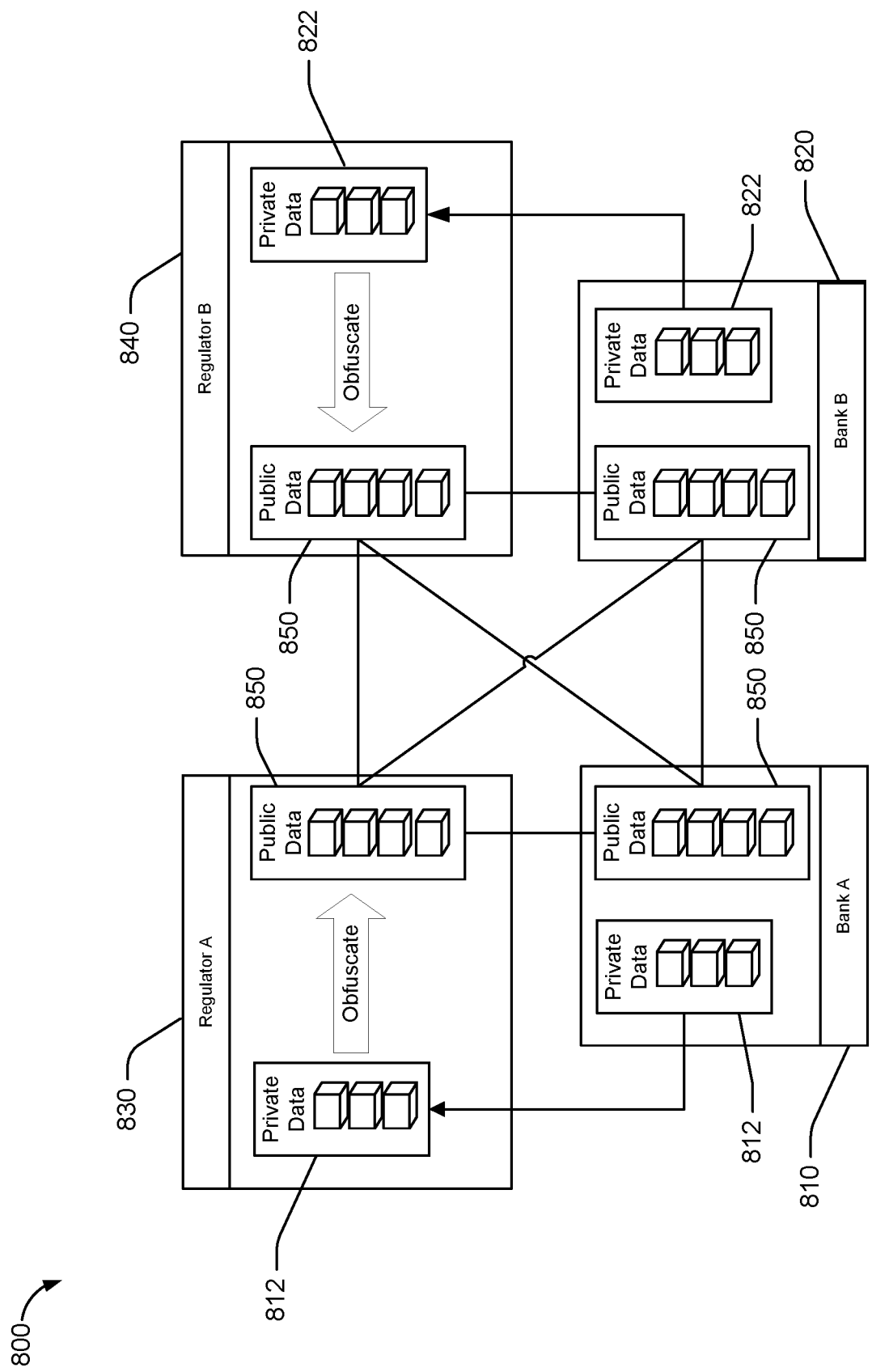
FIG. 8 is a conceptual diagram of an example implementation of a fraud information exchange using a consortium blockchain.

FIG. 8 is a conceptual diagram of an example consortium blockchain 800, which may be an implementation of the anti-fraud consortium 152. The consortium blockchain 800 may allow the publication of information in a manner that is secure, trustworthy, auditable, immutable, and privacy compliant. The consortium blockchain 800 may also be scalable, reliable, and performant. The consortium blockchain 800 may involve banks 810, 820, who publish data that may be useful in detection of fraud. For example, published data may include information regarding known bad actors, information regarding known good actors, aggregated information, and/or fraudulent transaction models that define fraudulent transactions or fraudulent schemes. The consortium blockchain 800 may also include regulators 830, 840 that add blocks to a public blockchain 850 via a mining or forging operation.

A bank 810 may want to publish private data 812 in a manner that allows bank 820 to use the private data 812 for fraud prevention, but which protects the privacy of customer information within the private data 812 and also protects the business interests of bank 810. The bank 810 may provide the private data 812 to a regulator 830 and/or regulator 840. The regulators 830, 840 may be neutral parties or service providers that manage the consortium blockchain 800. For example, the regulators 830, 840 may include the trust knowledge broker 150. The regulators 830, 840 may store received information when adding a new block to the public blockchain 850. In an implementation, the consortium blockchain 800 may use a blockchain algorithm such as Etherium. Blocks may be added to the public blockchain by mining or forging. When a block is added, a hash of previous block(s) is added to the new block to verify the previous block(s) and prevent the blocks from being modified because modification would change the hash stored in the later blocks.

The regulators 830, 840 may implement sharing rules selected by each bank 810, 820 to protect the privacy of the private data 812. For example, the regulators 830, 840 may obfuscate the private data 812. Obfuscation may allow a consortium member to verify information in the public blockchain 850 based on known information, but prevent a consortium member from extracting raw private data from the public blockchain 850. For example, the regulators 830, 840 may hash the private data 812 using a one-way hash function. For example, if the bank 810 wants to publish known good email addresses (e.g., email addresses of customer accounts that always pay bills), the regulators 830, 840 may obfuscate the email addresses by hashing the address and storing the hash values in the public blockchain 850. When the bank 820 wants to determine the reputation of a new email address, the bank 820 may hash the email address received from a customer, then compare the hashed email address with hash values stored in the blockchain. The bank 820, however, would not be able to generate a list of email addresses from the hash values, which protects the privacy of the customers and the business information of the bank 810.

Figure 9:
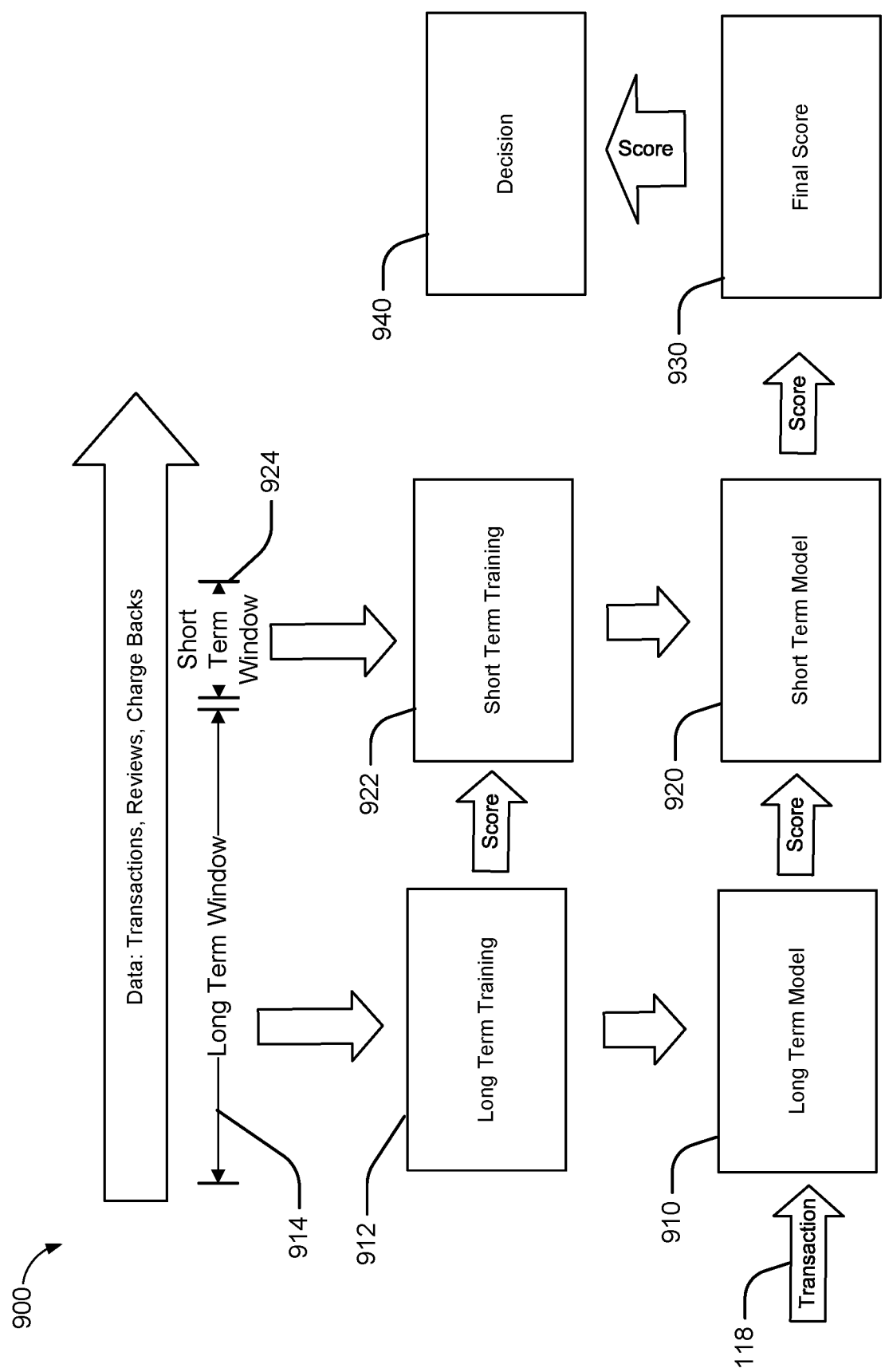
FIG. 9 is a conceptual diagram of an example machine learning evaluation of a transaction.

FIG. 9 is a conceptual diagram 900 of an example evaluation of a transaction using machine learning. The risk assessment application 146 may operate according to the conceptual diagram 900. Machine learning for fraud detection may utilize long term model 910 and short term model 920. Long term training 912 may use regression analysis to align classification of samples with an objective such as a desired key performance indicator (KPI). Long term training 912, however, may take a relatively long term window 914 (e.g., on the order of months) to develop, and may become outdated due to changing fraud patterns. Short term training 922 may be based on manual review of decisions, which may be available in a short term window 924 (e.g., on the order of 2 weeks). Short term training 922 may provide immediate feedback to the short term model 920 and may capture newly developing fraud patterns. The short term model 920, however, may be subjective or less accurate than the long term model 910. The risk assessment application 146 may use a combination of long term modelling and short term modelling.

As illustrated, when transaction data 118 for a transaction is received, the risk assessment application 146 may score the transaction with the long term model 910 and score the transaction with the short term model 920. The scores may be combined to determine a final score 930. The risk assessment application 146 may then use the final score 930 to make a rule based decision 940. The decision 940, for example, may be approve, decline, approve with manual review, or decline with manual review. The risk assessment application 146 may operate in real-time to provide the decision 940 to the merchant 110 and customer during the transaction. The transaction decisions 940 may be combined with additional information to further improve or train the machine learning models. For example, the decisions 940 may be compared to manual review decisions and charge back information, which may be received after the transaction is completed. The short term model 920 may be updated using a recent window (e.g., 2 weeks), while the long term model 910 may use a longer window (e.g., 1 year). The updated models, when available, may be used to score current transactions.

Figure 10:
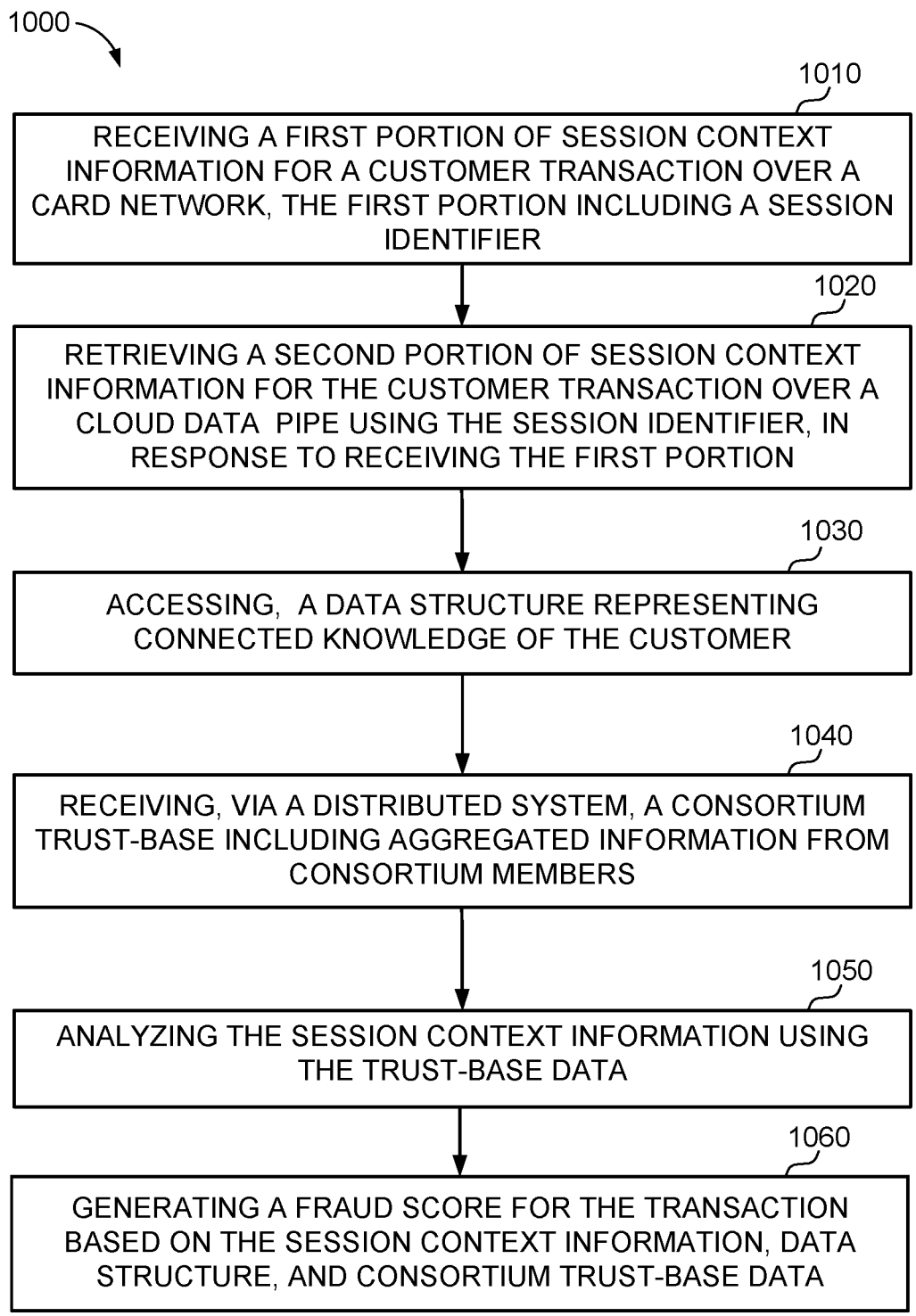
FIG. 10 is a flowchart of an example method of evaluating a transaction.

Referring now to FIG. 10, an example method 1000 provides for the computer device 310 to evaluate a transaction for potential fraud. More generally, the computer device 310 may perform risk detection in an electronic network. For example, method 1000 may be used by a bank issuer of a credit card to determine whether to approve or deny an interaction on the electronic network in real time. The actions illustrated in method 1000 may overlap in time. For example, at an instant in time, two of the actions may be performed by different components. Also, in some cases, the execution of the actions may also be interleaved on a component. Additionally, the actions illustrated in method 1000 may be performed in an order other than illustrated in FIG. 10.

At 1010, the method 1000 may include receiving a first portion of session context information for a customer transaction over a card network, the first portion including a session identifier. More generally, action 1010 may include receiving a first portion of session context information for an interaction of an individual over a limited bandwidth network, the first portion including a session identifier for the interaction. In an implementation, for example, the containerized service 142 may obtain the first portion of session context information (e.g., transaction data 118) for the customer transaction over the card network 130, which may have limited bandwidth for a particular transaction.

At 1020, the method 1000 may include retrieving a second portion of session context information for the customer transaction over a cloud data pipe using the session identifier, in response to receiving the first portion. More generally, the action 1020 may include retrieving a second portion of session context information for the interaction over a cloud data pipe using the session identifier, in response to receiving the first portion. In an implementation, for example, the cloud data pipe interface 354 may retrieve the second portion of session context information (e.g., transaction contextual data 116) for the customer transaction over the cloud data pipe 154 using the session identifier, in response to receiving the first portion. The second portion of the session context information may include hash values representing personally identifiable information regarding the customer. For example, the second portion of the session context information may include a device fingerprint 212, user behavior 214, and payment context 216.

At 1030, the method 1000 may include accessing, a data structure representing connected knowledge of the customer. More generally, the customer may be any individual attempting an interaction with the network. In an aspect, for example, the KYC application 144 may access the connected customer knowledge base 358 and/or the user profiles and inferences component 356. The KYC application 144 may obtain the example graph 700 representing connected knowledge of the customer.

At 1040, the method 1000 may include receiving, via a distributed system, consortium trust-base data including aggregated information from consortium members. More generally, the action 1040 may include receiving, via a distributed system, security reputation data including aggregated information from a plurality of members. The members may be members of a consortium. The distributed system may be a consortium trust base. In an implementation, for example, the anti-fraud consortium interface 352 may receive via the anti-fraud consortium 152 or consortium blockchain 800, consortium trust-base data including aggregated information from consortium members. In an implementation, the step 1040 may be performed prior to the transaction such that the public blockchain 850 is always up to date.

At 1050, the method 1000 may include analyzing the session context information using the trust-base data. More generally, action 1050 may include analyzing the session context information using the security reputation. In an implementation, for example, the risk assessment application 146 may analyze the session context information using the trust-base data. For example, the risk assessment application 146 may determine whether any identifier included in the session context information is identified as being associated with a bad actor in the public blockchain 850.

At 1060, the method 1000 may include generating a fraud score for the transaction based on the session context information, data structure, and consortium trust-base data. More generally, action 1060 may include generating a security risk score for the interaction based on the session context information, data structure, and the security reputation data. The security risk score may be referred to as a fraud score. In an implementation, for example, the risk assessment application 146 may generate a fraud score for the transaction based on the session context information using machine learning as described above with respect to FIG. 9. Further, the risk assessment application 146 may approve or deny the transaction based on the fraud score.

Figure 11:
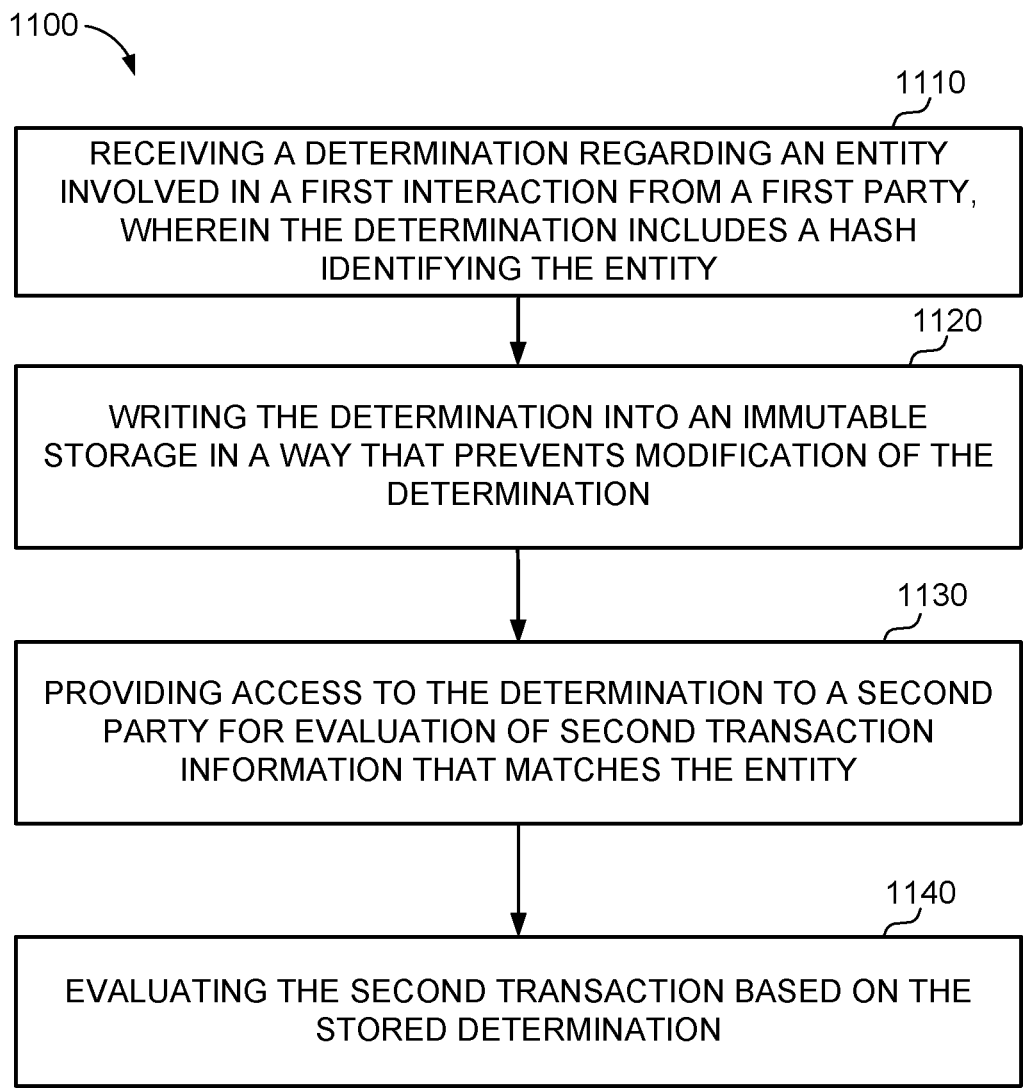
FIG. 11 is a flowchart of an example method of sharing fraud information in a consortium.

Referring now to FIG. 11, an example method 1100 provides for the computer device 310 to provide a distributed security reputation database. For example, method 1100 may be used by a trust knowledge broker 150 and/or a regulator 830 to provide a consortium fraud information service. The actions illustrated in method 1100 may overlap in time. For example, at an instant in time, two of the actions may be performed by different components. The execution of the actions may also be interleaved on a component. Additionally, the actions illustrated in method 1100 may be performed in an order other than illustrated in FIG. 11.

At 1110, the method 1100 may include receiving a determination regarding an entity involved in a first interaction from a first party, wherein the determination includes a hash identifying the entity. For example, the regulator 830 may receive a determination regarding an entity from a bank 810. The determination may include a hash identifying the entity. The hash may be based on a customer name , IP address, device fingerprint, or other characteristic. In an implementation, the regulator 830 may receive the raw data and perform a hash on the raw data.

At 1120, the method 1100 may include writing the determination into an immutable storage in a way that prevents modification of the determination. For example, the regulator 830 may write the determination into the public blockchain 850. The public blockchain 850 may prevent modification of the determination by adding a hash of the block including the determination into a later block such that modification can be detected. Further, the public blockchain 850 may be distributed to multiple banks and regulators such that multiple copies of the block containing the determination are available.

At 1130, the method 1100 may include providing access to the determination to a second party for evaluation of second transaction information that matches the entity. More generally, the second transaction information may be any information for a second interaction. For example, the regulator 830 may provide access to the determination to the bank 820 for evaluation of second transaction information that matches the entity. The regulator 830 may distribute the public blockchain 850 to the bank 820. The bank 820 may only be able to access the hashed identifier by hashing an identifier within the second transaction information to determine whether it matches a value stored in the public blockchain 850.

At 1140, the method 1100 may include evaluating the second transaction based on the stored determination. More generally, the second transaction may be any interaction on the network. For example, the bank 820 may evaluate the second transaction based on the stored information. For instance, the bank 820 may deny the second transaction if the determination indicates that the entity was previously involved in fraudulent transactions. Moreover, the public blockchain 850 may be used to support the evaluation by the bank 820.

Figure 12:
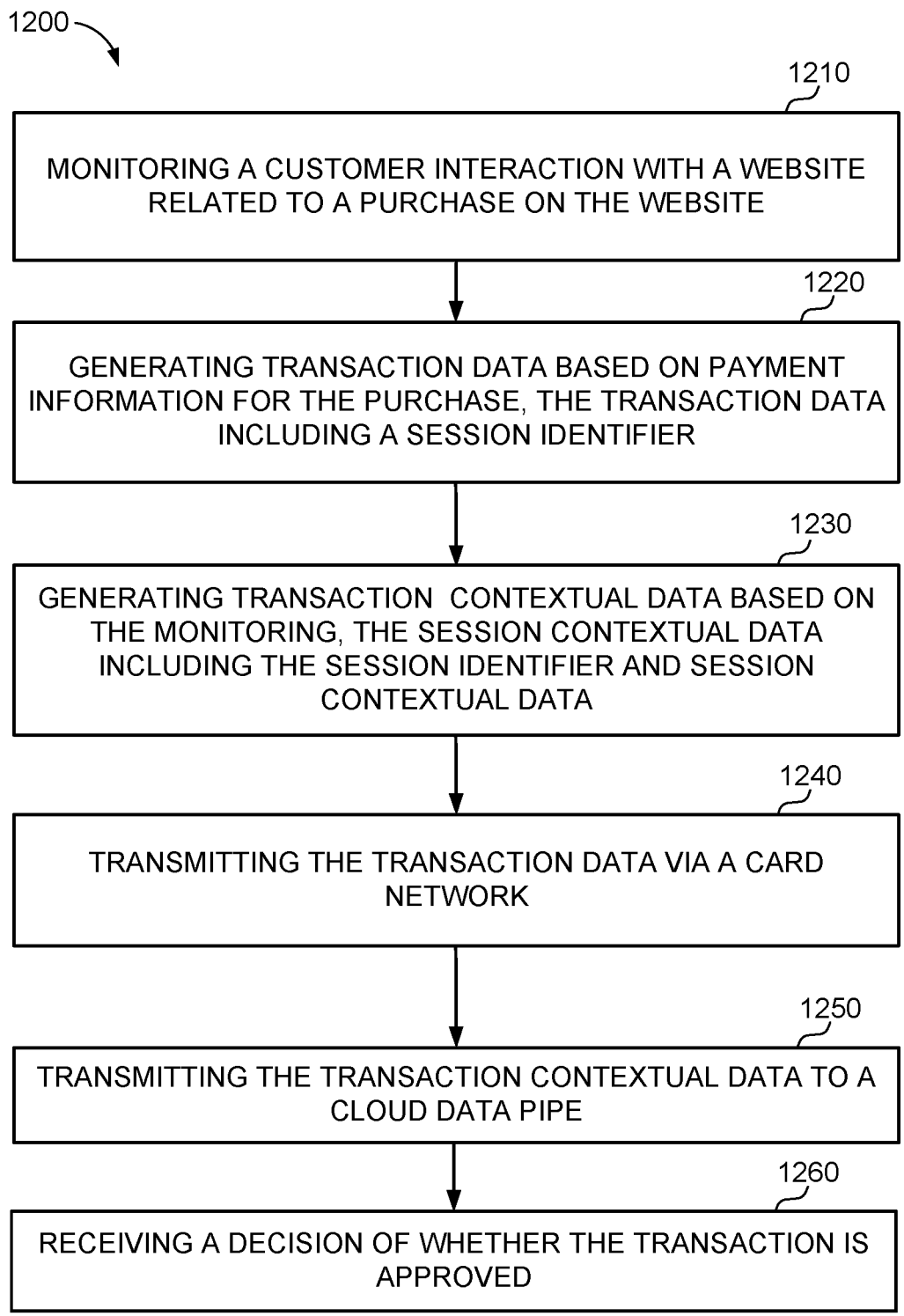
FIG. 12 is a flowchart of an example method of conducting an eCommerce transaction.

Referring now to FIG. 12, an example method 1200 provides for a website operator to provide contextual information for risk detection on an electronic network. For example, method 1200 may be used by a merchant operating a web site to improve fraud detection by another party such as a bank. The actions illustrated in method 1200 may overlap in time. For example, at an instant in time, two of the actions may be performed by different components. The execution of the actions may also be interleaved on a component. Additionally, the actions illustrated in method 1200 may be performed in an order other than illustrated in FIG. 12.

At 1210, the method 1200 may include monitoring a customer interaction with a website related to a purchase on the website. More generally, action 1210 may include monitoring behavior of a user with a website related to an interaction on the website. The user behavior may include any interaction with the website such as browsing the website, searching, or entering input. For example, the merchant 110 may use the instrumentation 114 to monitor a customer interaction with a web site related to a purchase on the website.

At 1220, the method 1200 may include generating transaction data based on payment information for the purchase, the transaction data including a session identifier. More generally, the action 1220 may include generating interaction data based on user information for the interaction, the interaction data including a session identifier. The interaction data may include information entered by the user for making a transaction (e.g., name, credit card number, address, and security code). For example, the merchant 110 may generate transaction data 118 based on payment information for the purchase. The payment information may be provided by a customer via the website of the merchant.

At 1230, the method 1200 may include generating transaction contextual data based on the monitoring, the transaction contextual data including the session identifier and transaction contextual data. More generally, the action 1230 may include generating interaction contextual data based on the monitoring, the interaction contextual data including the session identifier and session contextual data. The interaction contextual data may be, for example, transaction contextual data 116 including a device fingerprint 212, user behavior 214, and/or payment context 216. For example, the instrumentation 114 may generate transaction contextual data 116 based on the monitoring.

At 1240, the method 1200 may include transmitting the transaction data via a card network. More generally, action 1240 may include transmitting the interaction data via a limited bandwidth network. For example, the merchant 110 may transmit the transaction data via the card network 130. The card network 130 may be a limited bandwidth network carrying only certain fields of information for a specific transaction. The transaction data 118 may be transmitted via a processor 120.

At 1250, the method 1200 may include transmitting the transaction contextual data to a cloud data pipe. More generally, the action 1250 may include transmitting the interaction contextual data to a cloud data pipe. Once again, a transaction having transaction contextual data may be an example. For example, the merchant 110 or instrumentation 114 may transmit the transaction contextual data 116 to the cloud data pipe 154.

At 1260, the method 1200 may include receiving a decision of whether the transaction is approved. More generally, the action 1260 may include receiving a decision of whether the interaction is approved. For example, the merchant 110 may receive a decision of whether the transaction is approved from a retail bank 140. The retail bank 140 may determine whether the transaction is approved based at least in part on the transaction contextual data 116. For example, the retail bank 140 may include a containerized service 142 and/or implement the method 1000 to evaluate the transaction.

Figure 13:
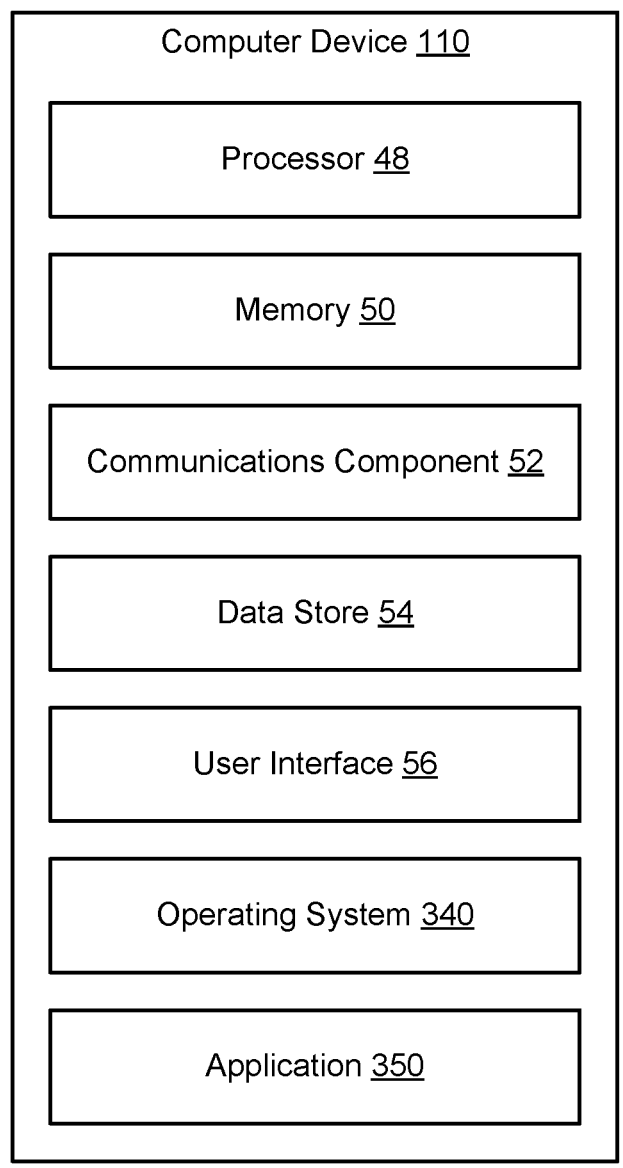
FIG. 13 is a schematic block diagram of an example computer device in accordance with an implementation of the present disclosure.

Referring now to FIG. 13, illustrated is an example computer device 310 in accordance with an implementation, including additional component details as compared to FIG. 3. In one example, computer device 310 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 may include CPU. In an example, computer device 310 may include memory 50 for storing instructions executable by the processor 48 for carrying out the functions described herein. In an implementation, for example, memory 50 may include memory 312.

Further, computer device 310 may include a communications component 52 that provides for establishing and maintaining communications with one or more parties utilizing hardware, software, and services as described herein. Communications component 52 may carry communications between components on computer device 310, as well as between computer device 310 and external devices, such as devices located across a communications network and/or devices serially or locally connected to computer device 310. For example, communications component 52 may include one or more buses, and may further include transmit chain components and receive chain components associated with a transmitter and receiver, respectively, operable for interfacing with external devices. In an implementation, for example, communications component 52 may include network interface.

Additionally, computer device 310 may include a data store 54, which can be any suitable combination of hardware and/or software, that provides for mass storage of information, databases, and programs employed in connection with implementations described herein. For example, data store 54 may be a data repository for operating system 340 (FIG. 3) and/or applications 350 (FIG. 3).

Computer device 310 may also include a user interface component 56 operable to receive inputs from a user of computer device 310 and further operable to generate outputs for presentation to the user. User interface component 56 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 56 may include one or more output devices, including but not limited to a display, a speaker, a haptic feedback mechanism, a printer, any other mechanism capable of presenting an output to a user, or any combination thereof.

In an implementation, user interface component 56 may transmit and/or receive messages corresponding to the operation of operating system 340 and/or application 350. In addition, processor 48 executes operating system 340 and/or application 350, and memory 50 or data store 54 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes computer storage media including any storage medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A method of risk detection in an electronic network for an interaction of an individual, comprising:
   receiving a first portion of session context information for the interaction over a limited bandwidth network, the first portion including a session identifier for the interaction;
   retrieving a second portion of the session context information for the interaction over a cloud data pipe using the session identifier;
   receiving, via a distributed system including a public blockchain storing obfuscated information, security reputation data including aggregated information from a plurality of members, wherein receiving the security reputation data comprises querying the public blockchain using obfuscated session context information;
   analyzing the session context information using the security reputation data; and
   generating a security risk score for the interaction based on the session context information and the security reputation data; and
   approving or declining the interaction based on the security risk score.

2. The method of claim 1, wherein the first portion of the session context information includes credit card transaction information and the second portion of the session context information includes hash values representing personally identifiable information regarding the individual.

3. The method of claim 2, further comprising accessing, a data structure representing connected knowledge of the individual, wherein the data structure is a graph of connected data points regarding the individual including session contextual information of previous interactions of the individual with a website of a credit card issuer.

4. The method of claim 1, wherein analyzing the session context information includes determining whether any identifier included in the session context information is identified as being associated with an identified bad actor in the security reputation data.

5. The method of claim 1, wherein generating the security risk score for the interaction includes scoring the interaction using a long term model and a short term model.

6. The method of claim 5, wherein the long term model is trained using regression analysis to align classification of transaction samples with an objective key performance indicator.

7. The method of claim 5, wherein the short term model is trained based on manual review of decisions.

8. A method of performing an electronic interaction on an electronic network, comprising:
   monitoring behavior of a user with a website related to an interaction on the website, wherein the monitoring includes tracking user behavior of viewing the website prior to the interaction using instrumentation on the website, wherein the monitoring includes placing tags on multiple pages that track the user behavior and engagement using a device fingerprint;
   determining whether the interaction is performed by a bot based on the user behavior;
   generating interaction contextual data based on the monitoring, the interaction contextual data including a session identifier and session contextual data including an indication of whether the interaction is performed by the bot;
   transmitting the interaction data via a limited bandwidth network;
   transmitting the interaction contextual data to a cloud data pipe; and
   receiving a decision of whether the interaction is approved.

9. The method of claim 8, wherein the device fingerprint includes one or more hashes of available device information.

10. The method of claim 8, wherein the monitoring includes determining a payment context of an account used for the interaction.

11. A computer device for fraud detection in a transaction network for a transaction of a customer, comprising:
   a memory storing one or more parameters or instructions for executing an operating system and one or more applications; and
   at least one processor coupled to the memory, wherein the at least one processor is configured to:
   receive a first portion of session context information for the transaction over a card network, the first portion including a session identifier for the transaction;
   retrieve a second portion of the session context information for the transaction over a cloud data pipe using the session identifier;
   receive, via a distributed system including a public blockchain storing obfuscated information, consortium trust-base data including aggregated information from consortium members, wherein receiving the consortium trust-base data comprises querying the public blockchain using obfuscated session context information;
   analyze the session context information using the consortium trust-base data;

generate a fraud score for the transaction based on the session context information and the consortium trust-base data; and approve or decline the transaction based on the fraud score.

12. The computer device of claim 11, wherein the first portion of the session context information includes credit card transaction information and the second portion of the session context information includes hash values representing personally identifiable information regarding the customer.

13. The computer device of claim 11, wherein the computer device is configured to access a graph of connected data points regarding the customer, wherein the fraud score is further based on the graph.

14. The computer device of claim 11, wherein analyzing the session context information includes determining whether any identifier included in the session context information is identified as being associated with a bad actor in the consortium trust-base data.

15. The computer device of claim 11, wherein the computer device is configured to generate the fraud score for the transaction by scoring the transaction using a long term model and a short term model.

16. The computer device of claim 15, wherein the long term model is trained using regression analysis to align classification of transaction samples with an objective key performance indicator.

17. The computer device of claim 15, wherein the short term model is trained based on manual review of decisions.

18. A non-transitory computer-readable medium, comprising code executable by one or more processors for fraud detection in a transaction network for a transaction of a customer, the code comprising code for:

receiving a first portion of session context information for the transaction over a card network, the first portion including a session identifier;

retrieving a second portion of the session context information for the transaction over a cloud data pipe using the session identifier, in response to receiving the first portion;

receiving, via a distributed system including a public blockchain storing obfuscated information, consortium trust-base data including aggregated information from consortium members wherein receiving the consortium trust-base data comprises querying the public blockchain using obfuscated session context information;

analyzing the session context information using the consortium trust-base data;

generating a fraud score for the transaction based on the session context information and the consortium trust-base data; and approve or decline the transaction based on the fraud score.

* * * * *